ary G. Shapiro

United States Patent [19]
Everett

[11] 3,782,329
[45] Jan. 1, 1974

[54] APPARATUS FOR DISPENSING PLASTIC MATERIAL OR THE LIKE
[75] Inventor: George Everett, Unionville, Conn.
[73] Assignee: Gros-Ite Industries, Inc., Farmington, Conn.
[22] Filed: Feb. 9, 1972
[21] Appl. No.: 224,757

Related U.S. Application Data
[63] Continuation-in-part of Ser. No. 91,665, Nov. 23, 1970, abandoned.

[52] U.S. Cl................ 118/215, 118/243, 425/311, 425/DIG. 809
[51] Int. Cl. ............................................. B05c 7/00
[58] Field of Search........... 425/311, 313, DIG. 809; 118/243, 263, 215, 317, 323; 83/355

[56] References Cited
UNITED STATES PATENTS
3,091,988  6/1963  Bonds................................... 83/355
3,360,827  1/1968  Aichele........................... 425/311 X

*Primary Examiner*—John P. McIntosh
*Attorney*—Harry G. Shapiro

[57] ABSTRACT

Plastic dispensing apparatus in which charges of plastic material are deposited in successive caps carried by a conveyor, the plastic material being metered and delivered by a blade which executes coordinated rotational and translational movement to controllably deposit the plastic charges in deeply recessed caps.

12 Claims, 21 Drawing Figures

APPARATUS FOR DISPENSING PLASTIC MATERIAL OR THE LIKE

This is a continuation-in-part of my pending application Ser. No. 91,665 filed Nov. 23, 1970 now abandoned.

This invention relates to improvements in means for dispensing or metering predetermined amounts of plastic material or the like and is more particularly directed to a machine for making plastic lined bottle caps or crowns which includes such means.

BACKGROUND OF THE INVENTION

Aichele U.S. Pat. No. 3,135,019 granted June 2, 1964 discloses a machine for providing bottle caps or the like with sealing liners by directly depositing charges of thermoplastic material in bottle caps in timed sequence, following which the charge in each cap is molded to provide a sealing liner for the cap. The individual charges of plastic material are quite small, being on the order of only a fraction of a gram. The charge must be of sufficient amount to suitably line the bottle cap upon molding. On the other hand, it is essential that the quantity of the charge be not so great as to interfere with proper molding, or to be forced onto the rim or skirt of the cap, as a result of which the product is defective and must be discarded.

It will be appreciated that with charges so small, the quantity of each charge is highly critical; a small variation from the desired predetermined amount results in a substantial measure of error or inaccuracy. Moreover, the critically accurate quantities deposited in the individual caps must be accomplished in timed sequence at high speeds so that the machine will be economical to operate.

Aichele U.S. Pat. No. 3,360,827, granted Jan. 2, 1968, discloses improved means for dispensing charges of plastic material in accurate amounts at very high rates of speed, the dispensing apparatus comprising a rotatably mounted blade which, in the operation of the apparatus, is rotated in synchronism with the movement of a conveyor to which the blade is related. Although the high speed apparatus disclosed in this patent operates satisfactorily for providing plastic material in bottle caps or crowns of the usual shallow type (crown heights of approximately 0.230 inch to approximately 0.267 inch), such apparatus is not suitable for the lining of deeply recessed caps such as the twist-off type, which have crown heights of approximately 0.600 inch to approximately 0.607 inch or approximately 0.854 inch to approximately 0.869 inch. The problem with the deeply recessed caps has been the inability to deposit the metered charges of plastic material substantially centrally in each of the caps so that in the subsequent molding of the charge in each cap, the plastic mass will be uniformly and properly distributed to provide a satisfactory seal liner for the cap.

BRIEF DESCRIPTION OF THE INVENTION

It is accordingly an object of the present invention to provide improved apparatus for high-speed dispensing of accurately metered charges of plastic material or the like that is particularly suited to meter, deliver and deposit charges of plastic material into deeply recessed bottle caps or other cupped receptacles.

Briefly stated, in accordance with a preferred embodiment of the present invention, the dispensing blade is caused to execute successive cycles of coordinated rotational and translational movement. A reciprocating component of motion is superimposed upon the rotational motion of the blade to cause the blade to also move linearly into and out of a deeply recessed receptacle. As a result, the blade, which has cut off a predetermined quantity or charge from a plastic mass conveyed into its path, is capable of delivering and controllably depositing the charge substantially centrally in a deeply recessed receptacle.

While the invention is particularly suitable for use in connection with the lining of bottle caps or the like and will be described in relation to a bottle cap lining machine, the dispensing device of the invention is not limited to this particular application or use.

BRIEF DESCRIPTION OF THE DRAWINGS

The invention will be further described with reference to the accompanying drawings, which illustrate a preferred and exemplary embodiment, and wherein:

FIGS. 9–12 illustrate another embodiment of the invention, FIG. 9 showing a vertical cross sectional view of another form of apparatus for imparting the coordinated rotational and translational movement to a dispensing blade;

FIG. 11 is a view taken approximately in the plane of line 11—11 of FIG. 9; and

DETAILED DESCRIPTION OF THE INVENTION

Figure 1:
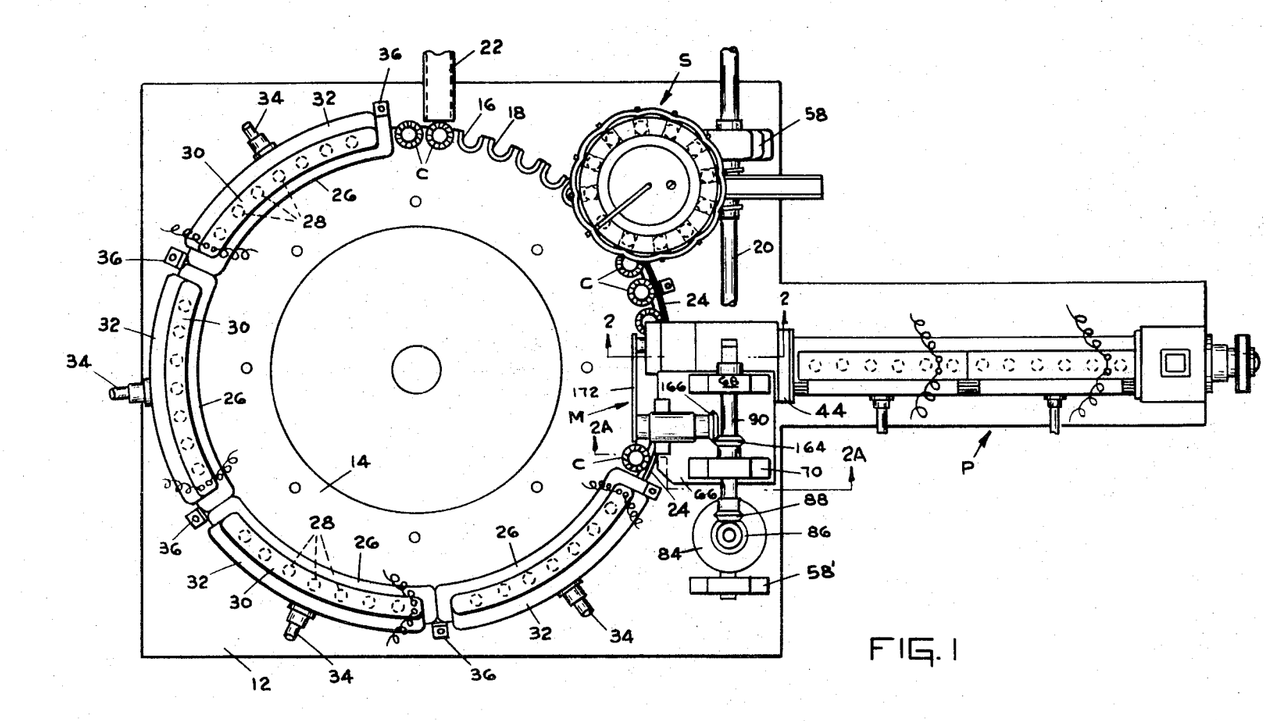
FIG. 1 is a top plan view of a cap seal lining machine which includes the plastic dispensing means of the invention.

Since the improved dispensing or metering means of the invention is particularly adapted for use in connection with a machine of the type disclosed in the aforementioned Aichele U.S. Pat. No. 3,135,019, such dispensing means, designated M, is shown in FIG. 1 associated with such type of machine. The machine will be described only to the extent of indicating the manner in which the metering means of the present invention cooperates with the relevant associated parts thereof. The detailed structure of one preferred embodiment of dispensing device and related drive means is illustrated in FIGS. 2-8.

As shown in FIG. 1, the bottle cap lining machine has a bedplate 12 which is suitably supported on a floor by legs or any other supporting means. Mounted on the bedplate 12 is a rotatable turntable conveyor 14 provided at its margin or outer periphery with a series of circumferentially spaced, outwardly open, cap-receiving notches 16. The notches may be provided with countersunk integral ledges or lips 18 upon which are seated the peripheral skirts of cap bodies C if the bodies are so formed. The turntable is rotated continuously by a drive mechanism including a main drive shaft 20. The details of the drive mechanism for the turntable are disclosed in the aforementioned Aichele U.S. Pat. No. 3,135,019. Rotation of the turntable carries the caps C to the dispensing means M which, as will be subsequently described in detail, deposits a measured amount L of a plastic seal liner forming material within and substantially centrally of each cap as it passes the metering means. Thereafter, the thus supplied caps are delivered by the turntable conveyor to means S where the plastic charge in each cap is molded to provide the seal liner for the cap.

In order for the turntable 14 to present caps to the metering means M and to the seal liner molding means S, the caps may be delivered to and successively positioned in the receiving notches 16 from a loading chute 22. As shown in FIG. 1, a keeper ring or member 24 surrounds that portion of the turntable conveyor 14 which carries the caps from the loading chute 22 of the cap supply means to the dispensing means M and to the seal liner molding means S. The keeper ring prevents outward displacement of the caps from the supporting notches 16 to the point where the caps are engaged by and are withdrawn from the turntable conveyor by the seal liner molding means.

Still referring to FIG. 1, the turntable conveyor 14 may have associated therewith means for preheating the caps to an elevated temperature. The cap preheating means extends from a point adjacent to the cap loading chute 22 to a point adjacent to the metering means and is disposed in overlying relation to the notched, marginal portions 16 of the turntable conveyor and the caps carried thereby. As shown, the cap preheating means comprises air chamber means 26 through which the conveyed caps C pass. The air chamber means is supplied by air heated by electric heater coils 28 which are arranged in connection with air receiving header means 30 having air delivery manifolds 32. Air is delivered to the manifolds by conduits 34, the latter being supplied by suitable means such as blower means (not shown). The cap preheating means is stationary and is mounted on the bedplate 12 by supporting brackets or posts 36.

The plastic material which is delivered to the metering means M and subjected to the operation thereof may have directly associated therewith means P for conditioning the thermoplastic material, as shown in FIG. 1. The conditioning means P is described in detail in the aforementioned Aichele U.S. Pat. No. 3,135,019 and need not be described here for it forms no part of the present invention. Suffice it to say that the dispensing means is supplied with heated plastic material maintained under sufficient and constant pressure to present a selected predetermined cross section of a continuously fed stream of plastic material to one or more rotating blades, which act at predetermined intervals to cut off and deliver predetermined quantities or charges of the plastic material. It is within the scope of the invention to use any desired means to condition the plastic material to make the plastic material a molten or flowable composition supplied under pressure to the metering means. The plastic material is preferably a thermoplastic compound such as polyethylene or a vinyl resin such as polyvinyl chloride or a copolymer or vinyl chloride and vinyl acetate. If desired, a suitable compound of a thermosetting resin may be used.

Although the dispensing device may be driven or actuated by any desired drive mechanism, it is convenient to operate the dispensing device off the same drive means or main drive shaft 20 which rotates the turntable conveyor 14 and which actuates the molding means S. It will, of course, be understood that the metering device of the invention, which is here shown supported on the machine bedplate 12, may be suitably supported in any desired manner and in relation to any conveying means intended to receive measured charges of plastic material. Also, while the conveying means herein illustrated is in the form of a rotatable turntable, it is contemplated that the conveying means may be in the form of a belt conveyor which travels linearly or in a straight line.

The foregoing description with respect to FIG. 1 is essentially the same as the corresponding description in the aforesaid Aichele U.S. Pat. No. 3,360,827, which may be referred to for further details not repeated here. In order to facilitate reference to the patent, the same reference numerals are used herein wherever possible.

Figure 2:
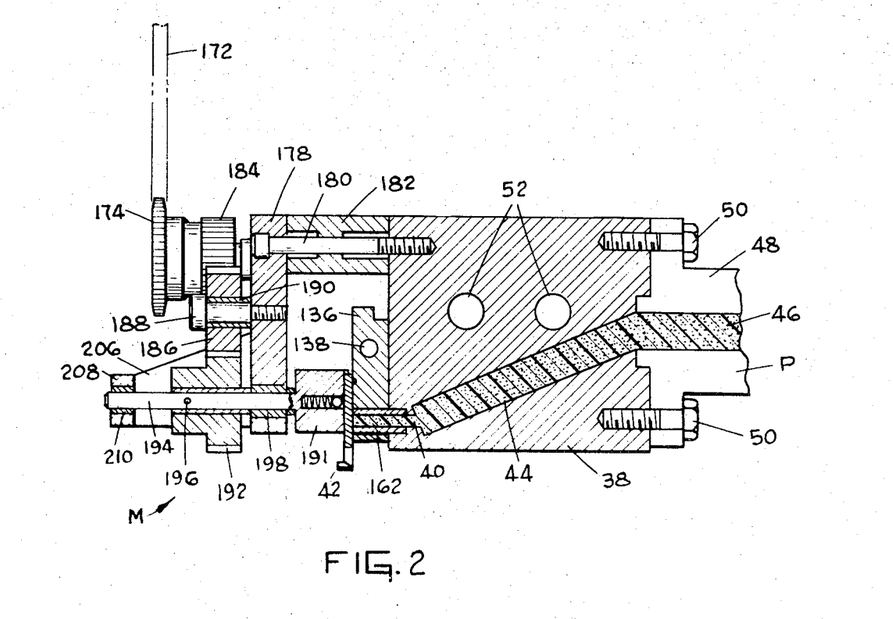
FIG. 2 is a partial, vertical cross sectional view taken approximately in the plane of line 2—2 of FIG. 1 and illustrating the dispensing blade of the invention in conjunction with its drive train and the plastic discharge passage.

Referring to FIG. 2, the dispensing device generally comprises a body or block 38 having a discharge passage 40 which is kept filled with plastic material in heated condition. The plastic material is expelled through the exit end of the discharge passage where it is acted upon or cut off by a rotary blade 42. In order to increase the production of the device, a second rotary blade and a discharge passage associated therewith may be used.

In greater detail, and referring to FIG. 2, the discharge passage 40 is in communication with an intake passage 44 formed in the block 38. The intake passage is in communication with a passage 46 formed in a coupling fitting 48 leading from the plastic material conditioning means P. The block 38 may be secured to the fitting 48 by bolts 50. The block is heated by a suitable fluid such as hot water in order to maintain the plastic material passing therethrough in a heated or molten condition. For this purpose, the block may be provided with a series of passages 52 for the circulation of the heated fluid through the block.

Although the apparatus specifically shown in Aichele U.S. Pat. No. 3,360,827 includes measuring plungers for furnishing predetermined quantities of plastic material to and through the discharge passage 40, as stated in this patent, the plungers may be eliminated. The apparatus of the present invention is shown with the plastic material being fed directly to the passage 44 and the discharge passage 40 from the plastic material conditioning means P. With the exit end of the discharge passage of a selected predetermined diameter, and with the plastic material in the discharge passage maintained at a selected and constant pressure, the operation of the blade 42 associated with the discharge passage 40 at a selected rate results in plastic charges of a selected uniform quantity being cut off.

Figure 2A:
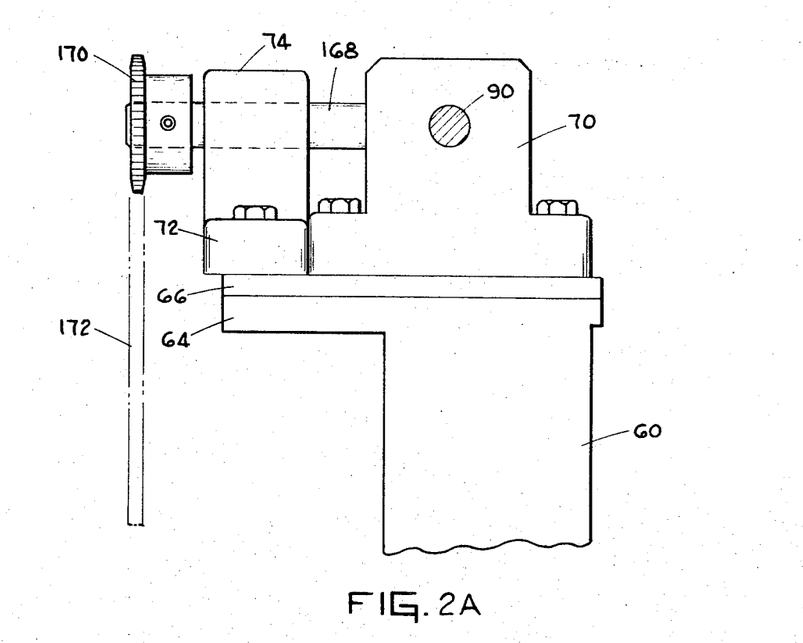
FIG. 2A is a partial, vertical view taken approximately in the plane of line 2A—2A of FIG. 1.
Figure 3:
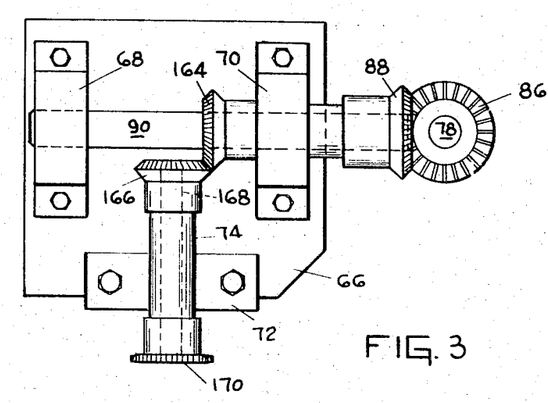
FIG. 3 is a top plan view of a portion of the drive train.

As illustrated in FIGS. 1, 2A, and 3, the main drive shaft 20 is journaled in a pair of spaced pillow blocks 58, 58' supported on the bedplate 12. A pair of laterally spaced vertical standards 60 (one of which is shown in FIG. 2A) is bolted to the bedplate 12. A platform 64 is welded to the standards 60 at the top thereof to provide a support for a plate 66. The plate 66 provides a base for a pair of transversely spaced pillow blocks 68 and 70 (see FIG. 3). The plate 66 also furnishes a support for a base plate 72 upon which a shaft bearing 74 is mounted.

The main shaft 20 is provided with a miter gear (not shown) which drives a plate gear 84 (FIG. 1) secured to the lower end of a vertical shaft 78 (FIG. 3) supported for rotation by spaced pillow blocks (not shown) on one of the standards 60. The upper end of this shaft has a miter gear 86 fastened thereto, such gear meshing with a mating gear 88 secured to the end of a horizontally extending shaft 90 which is journaled in the aforementioned pillow blocks 68 and 70. A miter gear 164 is fixed to rotate with shaft 90, such gear being positioned on the shaft intermediate the pillow blocks 68 and 70. The gear 164 is in meshing engagement with a gear 166 fixed to the end of a stub shaft 168 journaled in the aforementioned shaft bearing 74. The stub shaft is positioned to extend at a right angle to the shaft 90.

As shown in FIGS. 2A and 3, stub shaft 168 has a sprocket 170 secured to its forward end. A chain 172 extends over the sprocket and a second sprocket 174 rotatably supported upon a plate 178 by means of a shaft (not shown), as shown in FIG. 2. The mounting plate 178, which supports the gearing for driving the dispensing blade or blades, is in turn secured to the heated block 38 by means of screws 180 which extend through spacers 182, a typical screw and spacer being shown in FIG. 2. The spacers insulate the mounting plate 178 from the heated block 38.

The sprocket 174 is secured, as by welding, to a drive gear 184 located rearwardly of the sprocket and forwardly of the mounting plate 178. As shown in FIG. 2, the drive gear is in meshing engagement with an idler gear 186. The idler gear is mounted for rotation on a shoulder screw 188 extending into the mounting plate 178. A bronze bushing 190 is pressed into the center hole of the gear so that the gear may rotate freely. The idler gear is in meshing engagement with driven gear 192.

As also shown in FIG. 2, driven gear 192 is fixed to an elongated shaft 194 to rotate therewith, as by a pin 196, so that the shaft cannot move axially with respect to the gear 192. The shaft 194, which is part of the blade holder 189, extends forwardly and rearwardly of the gear 192. In the rearward direction, the shaft extends through a bushing 198 press fitted into an aperture extended through the mounting plate 178. At its most rearward end, the shaft 194 is provided with a cylindrical hub 191 integral therewith. As will be subsequently described in detail, the hub is formed to receive the blade in a manner which will allow the blade to be both rotated and reciprocated. At its forward end, shaft 194 is supported upon a substantially L-shaped bracket 206 secured to the mounting plate 178 and having its front arm 208 provided with a threaded bore for receiving a bearing bushing 210 for shaft 194.

The blade 42 is juxtaposed with the forward face of a block 136, which is adjacent to and forward of block 38. For convenience of manufacture of the machine, the block 136 is made as a separate part and connected to the block 38 of which, in effect, it is an extension. As will subsequently appear, a cam track is formed in block 136, it being more convenient to handle this comparatively small piece for the machining of the cam track therein rather than the larger block 38. Also, when the plastic material is of a composition which has a tendency to stick to the blade, this part is provided with suitable passages 138 for the circulation of a coolant such as water at room temperature or colder. In order to prevent chilling of the heated plastic in discharge passage 40 as it is fed to the dispensing blade, a heat insulating sleeve 162, preferably made of Teflon, is positioned within the block 136 as shown in FIG. 2. The blade 42 is cooled by contact with block 136, so that the blade will not become smeared or cause smearing of the plastic material which is fed through the discharge passage 40 and is cut off by the blade. The blade overhangs the margin of the turntable conveyor 14, the showing of which is omitted in FIG. 2.

As shown in FIGS. 4, 5, 6 and 7, the hub 191 of the blade support has a rectangular slot 193 formed in its rear face, the slot extending perpendicular to the axis of the shaft portion 194. The blade 42 has a substantially rectangular base portion 195 which fits guidedly within the slot 193 with a slight amount of clearance at each side so that the blade is capable of confined reciprocation in a direction perpendicular to the axis of the shaft 194. The blade is resiliently urged against the block 136 by a spring-biased ball 204, both the ball and the biasing spring 212 being received within an axial bore 197 in the hub 191.

Figure 5:
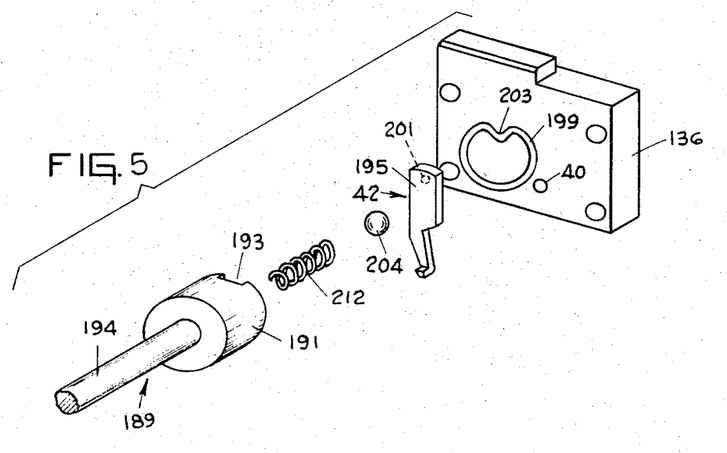
FIG. 5 is an exploded perspective view illustrating the dispensing blade and portions of the apparatus closely associated therewith.
Figure 6:
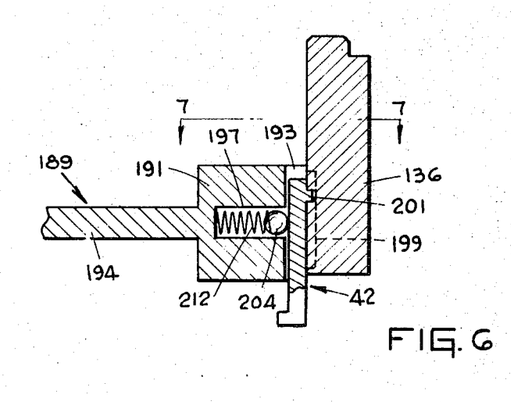
FIG. 6 is a vertical cross sectional view illustrating the components of FIG. 5 in their operative relationship.
Figure 7:
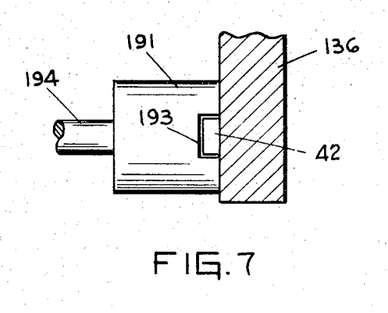
FIG. 7 is a cross sectional view taken approximately in the plane of line 7—7 of FIG. 6.
Figure 8A:
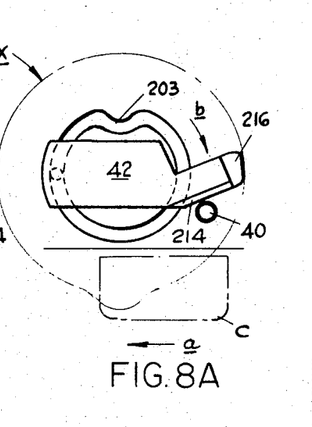
FIGS. 8A through 8E are diagrams illustrating a cycle or successive positions of the dispensing blade and a cap which receives a charge of plastic through the operation of the blade.
Figure 8B:
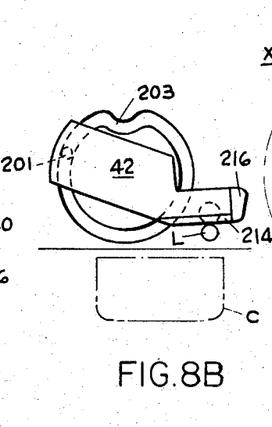
Figure 8C:
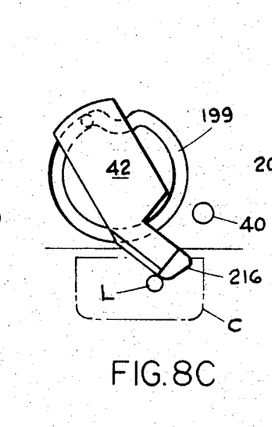
Figures 8D, 8E:
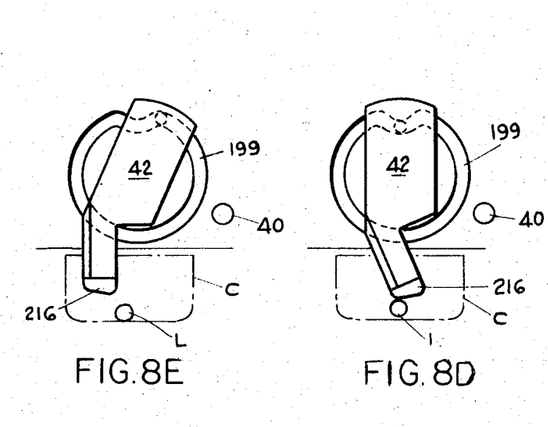

The forward face of the block 136 is provided with a groove 199 constituting a cam track for receiving a cam follower in the form of a boss 201 integral with the blade 42, the cam follower extending rearwardly from the blade's base portion 195 adjacent one end thereof. As shown in FIGS. 5 and 8, the cam track 199 defines a circle with an indented portion 203 at the top, the region most remote from the conveyor 14. The cam track is thus approximately heart-shaped. As the hub 191 rotates, the blade 42 rotates with it, and the follower 201 is constrained to follow the track 199, which imparts a translational or linear component of motion to the blade coordinated with the blade's rotation. As described, the resiliently mounted blade is floatingly confined in the slot 193 of the blade holder 189 for rotational movement coupled with translational movement at a desired segment of a cycle.

FIG. 8 illustrates the operation of the dispensing blade 42 in depositing a plastic charge L in a cap C that is deeply recessed, such as a cap of the twist-off type. The cap C is one of a plurality carried past the plastic material discharge passage 40 by the conveyor 14, in the direction designated by arrow $a$, the path of cap travel having a segment below and adjacent to the exit end of the discharge passage. As the blade 42 is continuously rotated in the direction of arrow $b$ by the described drive mechanism, the cam follower 201 follows the cam track 199, the tip of the blade moves along the path $x$ shown in phantom lines at position A of FIG. 8. Throughout the major portion of one cycle of movement, the blade rotates, because the circular portion of the cam track is concentric with the axis of shaft 194, but during a part or segment of each cycle a coordinated translational component is superimposed upon the blade's rotational motion by the indented section 203 of the cam track.

Figure 4:
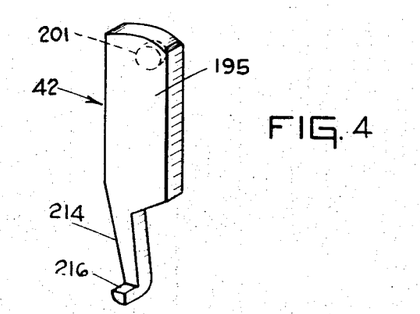
FIG. 4 is a perspective view of the dispensing blade.

At position A of FIG. 8, the blade is shown just arriving at the exit end of the discharge passage 40. The blade has a beveled shearing edge 214 which sweeps across the exit end of the discharge passage to cut off or shear the section of plastic material extruded from the discharge passage, the cut off portion being shown as the charge L. at position B. As shown in FIG. 4, the blade is further provided with a portion 216 angulated with respect to the shearing edge 214 which serves to deliver the cut off section or charge L downwardly into a cap. Due to the resilient mounting of the dispensing blade, extrusion of plastic material from the discharge passage is unhindered when the blade is at the position B. At position C, the tip 216 of the blade has entered the interior of the cap, carrying with it the charge L. At this point, the follower 201 is commencing to engage the indented portion 203 of the cam track. At position D, the follower has moved to the bottom of the indented portion, and the blade has translated to the bottom of its excursion within the cap, depositing the charge L substantially in the center on the bottom of the cap. At position E, the follower has cleared the indented portion of the cam track, lifting the tip of the blade upwardly in the cap's interior. Further rotary movement of the blade, coupled with the advance of the cap by the conveyor, withdraws the tip of the blade from the cap, and the blade proceeds to position A, whereupon the cycle repeats with respect to the next cap. As above described, the blade provides a wiping motion to position the plastic charge substantially centrally within the cap.

In the embodiment of the invention illustrated in FIGS. 9–12, like or similar elements will be designated by the same or primed reference characters used to designate the elements of the embodiment of the invention hereinbefore described. The blade 42' is positioned between the block 38 and a rotatable support member 220. A spacer 222 may be mounted adjacent to and forward of the block 38. The discharge passage 40 for the plastic material extends through the block and through the spacer, and as previously described, a heat insulating sleeve 162 may be positioned to extend around the discharge passage to prevent chilling of the heated plastic material in the passage.

Figures 9, 11:
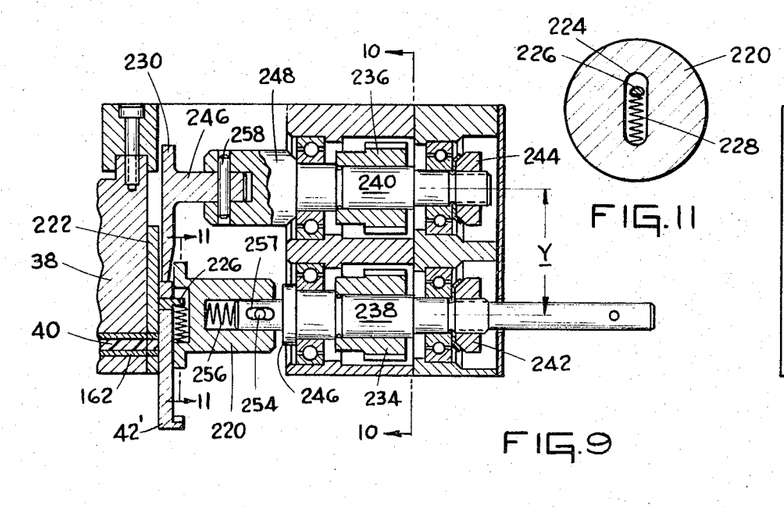
Figure 10:
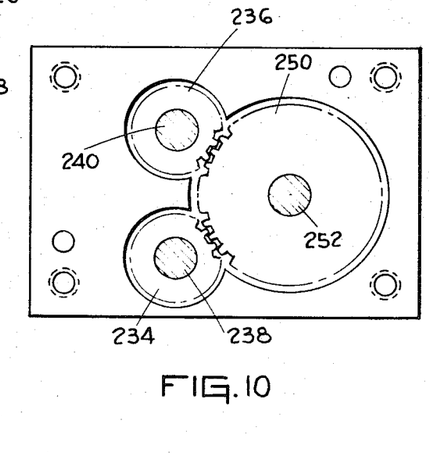
FIG. 10 is a view taken approximately in the plane of line 10—10 of FIG. 9.

As shown in FIGS. 9 and 11, the support member 220 has a recess 224 therein which extends perpendicular to the axis of rotation of the support member. A projection 226 is fixed to the blade 42' near the upper end of the blade. The projection extends into the recess 224 with a slight amount of clearance and is engaged by resilient means 228 which may be a coiled compression spring. The spring acts to normally urge the blade in a direction perpendicular to and outwardly with respect to the axis of rotation of the blade support member 220.

Figure 12A:
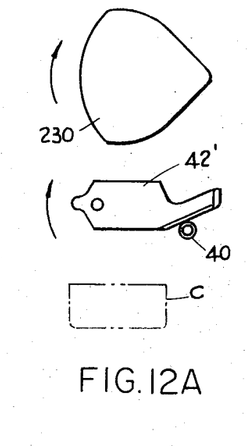
FIGS. 12A through 12E are diagrams illustrating part of a cycle wherein a cap receives a charge of plastic by the operation of the blade as actuated by the means shown in FIGS. 9–11.
Figure 12B:
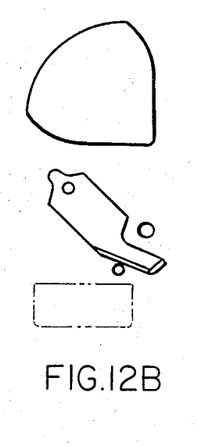
Figure 12C:
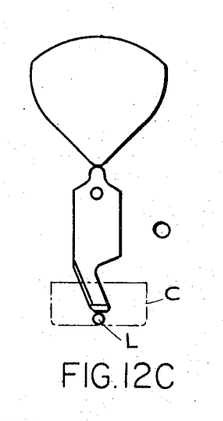
Figure 12D:
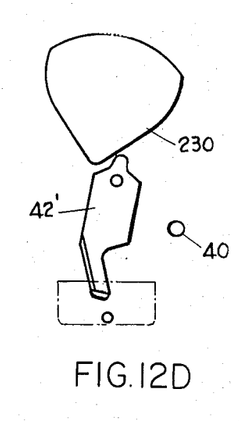
Figure 12E:
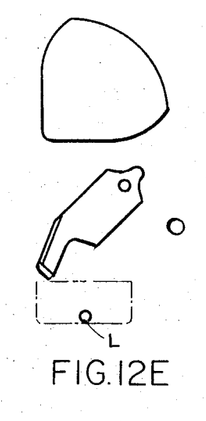

A rotatable cam 230 is cooperable with the spring mounted blade 42' to impart translational or linear movement to the blade during a portion or segment of the blade's cycle of rotation. The cam is provided with a lobe 232 for engagement with the upper end of the blade. The structural relationship of the cam and blade as shown in FIG. 9 corresponds to stage C as illustrated in FIG. 12. The axis of rotation of the cam 230 is above and a fixed distance y from the axis of rotation of the blade support member 220. Thus, with the projection 226 near the upper end of the blade and the spring 228 acting on the projection, the blade is urged outwardly or away from the axis of rotation of the support member.

A suitable drive for the rotatable blade and cooperable rotatable cam may comprise a gear box wherein a support member gear 234 and a cam gear 236 are respectively fixed to shafts 238 and 240. As shown in FIG. 9, the shafts are suitably supported at each end in bearings and the shafts are held in place at one end by lock nuts 242 and 244, respectively. At the opposite end of the shaft 238, a flange 246 engages the bearing and prevents lengthwise movement of the shaft. The shaft 240 is held against lengthwise movement by a cam holder 248 which is formed to abut the adjacent bearing. An idler gear 250 mounted on a shaft 252 is in meshing engagement with the blade support and cam gears 234 and 236 so that the blade and cam will rotate in the same direction. As shown, the shaft 238 is made to extend outside the gear box for connection to a suitable drive mechanism.

As shown in FIG. 9, the blade support 220 may be releasably secured to the shaft 238 by a pin 254. If desired, and as shown, a compression spring 256 may be positioned in the bore which receives the end of the shaft so that resilient pressure may be applied to the blade support to urge the support against the adjacent face of the blade 42'. The shaft is provided with a lengthwise slot 257 through which the pin 254 is extended to allow the spring to act on the blade support. Also, the cam holder 248 may be apertured to receive a close fitting pin 258 extended through the holder and aligned openings in an extension 260 of the cam so that the cam may be held in place and replaced by removal of the pin.

The operation of the blade and its related cam is shown for a portion of the cycle in FIG. 12, and is essentially the same in operation as the embodiment of the invention as illustrated in the portion of the cycle shown in FIG. 8. This embodiment of the invention furnishes improved resistance to wear of the parts. The engagement of the cam with the blade to linearly displace the blade occurs for only one small segment of the complete cycle as illustrated at stage C of FIG. 12. As a result, there is less wear on the blade and on the cam than in the previously described embodiment of the invention wherein a cam follower on the blade is in constant and continuous engagement with the cam groove. The described arrangement permits the ready replacement of the blade and the replacement of the cam with cams of different height for different depths of receptacles or caps by simply removing the pins 254 and 258.

The drive mechanism for moving the dispensing blade is, of course, synchronized with the rate of rotation of the conveyor or turntable 14. A plurality of blades may act simultaneously to deposit charges of plastic material L in a plurality of caps C, with the dispensing blades and the conveyor having continuous movement imparted thereto. The direction of rotation of the blades and the conveyor is such that the blade tips and the caps carried by the conveyor move horizontally in the same general direction as the blade tips pass through the caps.

Subsequent to receiving charges of plastic material in successive caps, the turntable 14 brings the charged caps to the molding and shaping means S (FIG. 1) where the charges are molded to provide a sealing liner for each cap. Such means S may be essentially the same as disclosed in the aforementioned Aichele U.S. Pat. No. 3,135,019 and does not constitute a part of the present invention.

While several preferred embodiments of the invention have been shown and described, it will be apparent to those skilled in the art that changes can be made in these embodiments without departing from the principles and spirit of the invention, the scope of which is defined in the appended claims.

I claim:

1. Apparatus for dispensing predetermined quantities of plastic material or the like comprising a block having a discharge passage, means for feeding plastic material through the discharge passage, a blade mounted for rotational and linear movement adjacent the exit end of the discharge passage, means for rotating the blade across the exit end of the discharge passage and for imparting coordinated linear movement to the blade, a conveyor, and means for moving the conveyor along a path adjacent to the exit end of the discharge passage, the blade being positioned to closely and directly overhang the conveyor, the linear movement of the blade being toward and away from the conveyor.

2. Apparatus according to claim 1, wherein the means for rotating the blade across the exit end of the discharge passage and for imparting coordinated linear movement to the blade comprises a cam track in the block and the blade is provided with a cam follower positioned in the cam track, and resilient means for urging the blade toward the block.

3. Apparatus according to claim 2, wherein the blade is mounted in a holder comprising a shaft portion and a hub portion, the shaft portion being connected to means for rotating the holder, the hub portion being provided with a slot extending perpendicularly to the axis of the shaft portion, the blade being positioned with the slot for confined reciprocation in a direction perpendicular to said axis.

4. Apparatus according to claim 3, wherein the major portion of the cam track is substantially circular and the upper side of the track is indented, the circular portion being substantially concentric with the axis of the blade holder's shaft portion.

5. Apparatus according to claim 2, including means for continuously moving the conveyor and for continuously rotating and imparting coordinated linear movement to the blade in synchronism with the movement of the conveyor, the conveyor being formed to support deeply recessed receptacles in equally spaced relation.

6. Apparatus according to claim 3, including means for continuously moving the conveyor and for continuously rotating and imparting coordinated linear movement to the blade in synchronism with the movement of the conveyor, the conveyor being formed to support deeply recessed receptacles in equally spaced relation.

7. Apparatus according to claim 4, including means for continuously moving the conveyor and for continuously rotating and imparting coordinated linear movement to the blade in synchronism with the movement of the conveyor, the conveyor being formed to support deeply recessed receptacles in equally spaced relation.

8. Apparatus according to claim 1, including means for continuously moving the conveyor and for continuously rotating and imparting coordinated linear movement to the blade in synchronism with the movement of the conveyor, the conveyor being formed to support deeply recessed receptacles in equally spaced relation.

9. Apparatus according to claim 1 wherein the blade is positioned between the block and a rotatable support member, the support member having a recess extending perpendicular to its axis of rotation, a projection extending from the blade into the recess, resilient means within the recess in engagement with the projection to normally urge the blade in a direction perpendicular to the axis of rotation of the support member, and a rotatable cam for engagement with the blade to linearly displace the blade against the force of the resilient means.

10. Apparatus according to claim 9 wherein the axis of rotation of the rotatable cam is above and a fixed distance from the axis of rotation of the support member, wherein the projection is near the upper end of the blade and the resilient means normally urges the blade outwardly with respect to the axis of rotation of the support member.

11. Apparatus according to claim 10 wherein the support member and the cam are each provided with a shaft having a gear fixed thereto, an idler gear in engagement with the gears for the support member and the cam for rotating the support member and the cam in the same direction, and means for rotating one of said shafts.

12. Apparatus according to claim 10 including means for continuously moving the conveyor and for continuously rotating and imparting coordinated linear movement to the blade in synchronism with the movement of the conveyor, the conveyor being formed to support deeply recessed receptacles in equally spaced relation.

* * * * *